United States Patent [19]

Réaux

[11] Patent Number: 4,909,281
[45] Date of Patent: Mar. 20, 1990

[54] APPARATUS FOR REPLACING A SECTION OF A PIPELINE

[76] Inventor: James R. Réaux, 219 Conde, St. Martinville, La. 70582

[21] Appl. No.: 195,244

[22] Filed: May 18, 1988

[51] Int. Cl.$^4$ ............................................. F16L 55/18
[52] U.S. Cl. ........................................ 138/97; 138/89
[58] Field of Search ..................... 138/89, 97, 98, 99; 29/402.03, 402.08; 137/15; 285/15

[56] References Cited

U.S. PATENT DOCUMENTS

| | | | |
|---|---|---|---|
| 3,285,290 | 11/1966 | Morrison | 138/97 |
| 3,503,424 | 3/1970 | Sawyer | 138/97 |
| 4,077,435 | 3/1978 | Van Scoy | 138/97 |
| 4,658,860 | 4/1987 | Reaux | 138/89 |

FOREIGN PATENT DOCUMENTS 670410  9/1963  Canada ..................................... 138/97

Primary Examiner—James E. Bryant, III
Attorney, Agent, or Firm—Fulbright & Jaworski

[57] ABSTRACT

Replacing a section of a pipeline by indenting the pipeline from the outside to provide a stop shoulder on the inside adjacent the section to be replaced. Positioning and securing an anchoring and seal pig in the pipeline against the stop shoulder, removing the section of the pipeline to be replaced including the stop shoulder, replacing a new section, and releasing and removing the anchoring and seal pig in order to provide space for the replacement section. A part of the anchoring and seal pig is removed prior to replacing a new section.

5 Claims, 6 Drawing Sheets

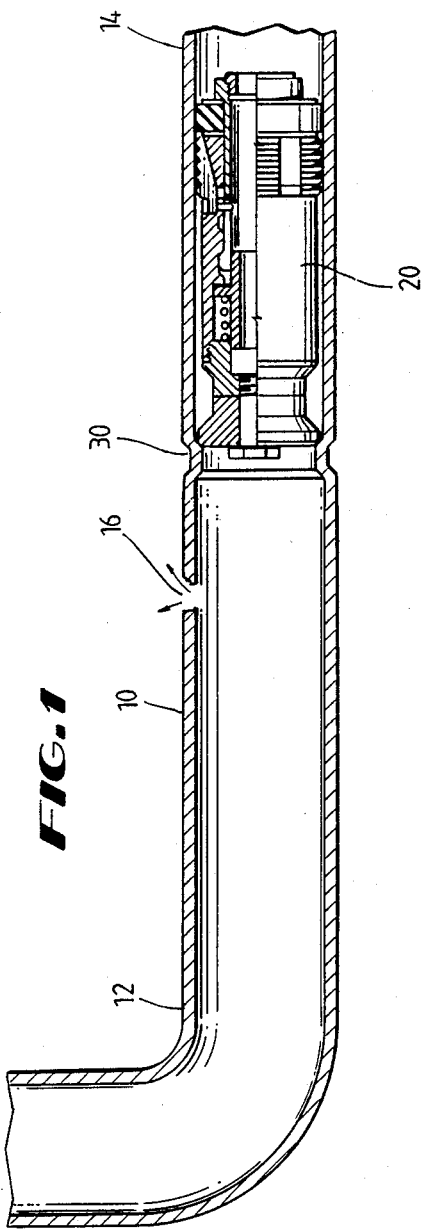
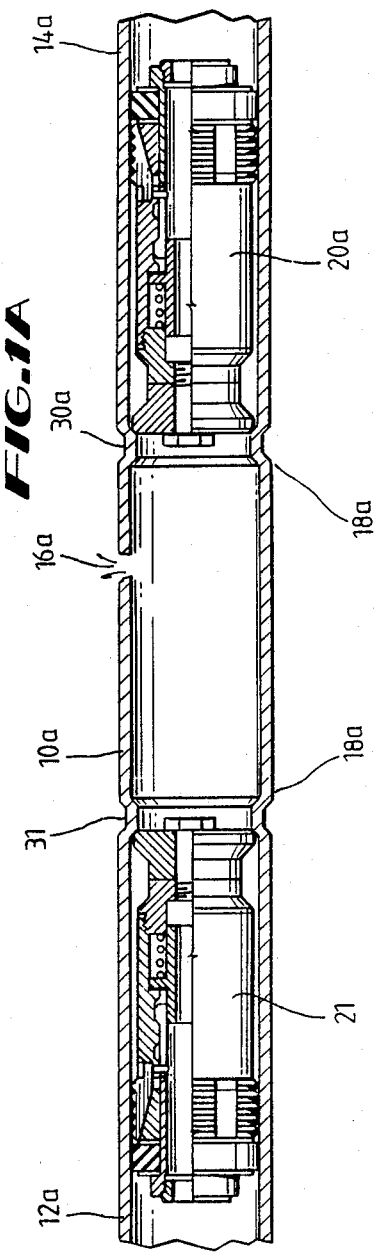

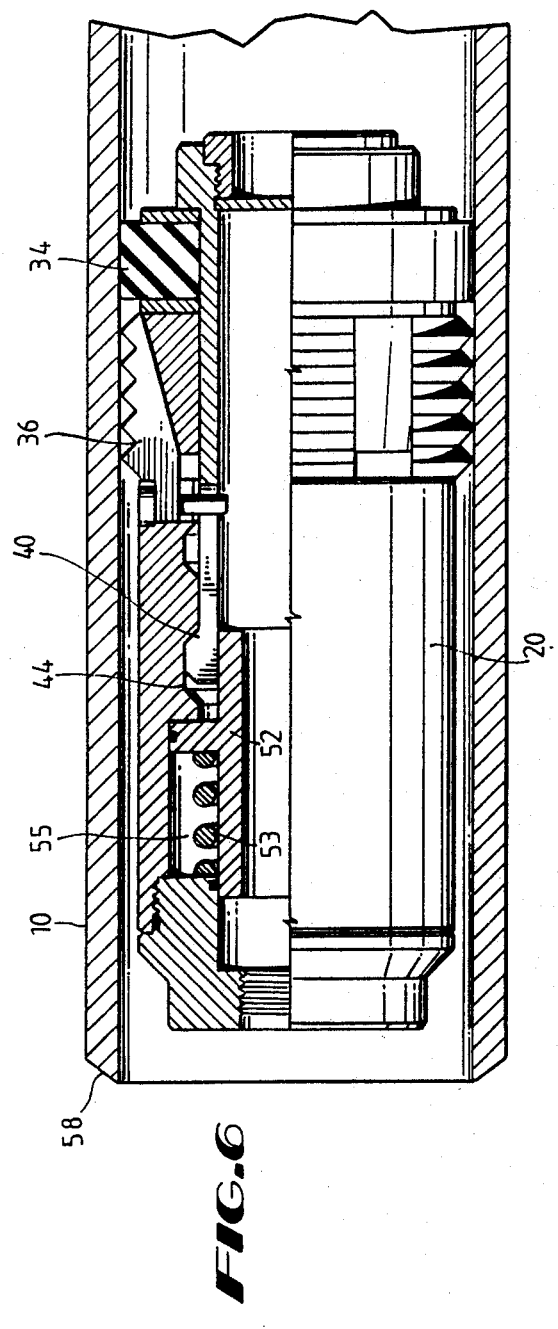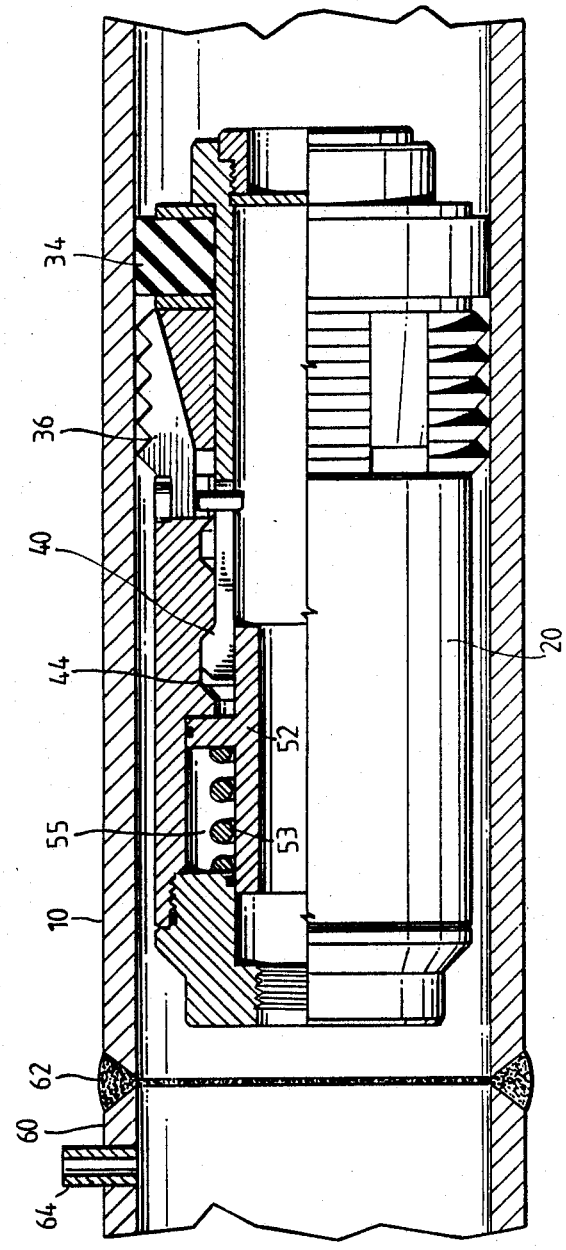

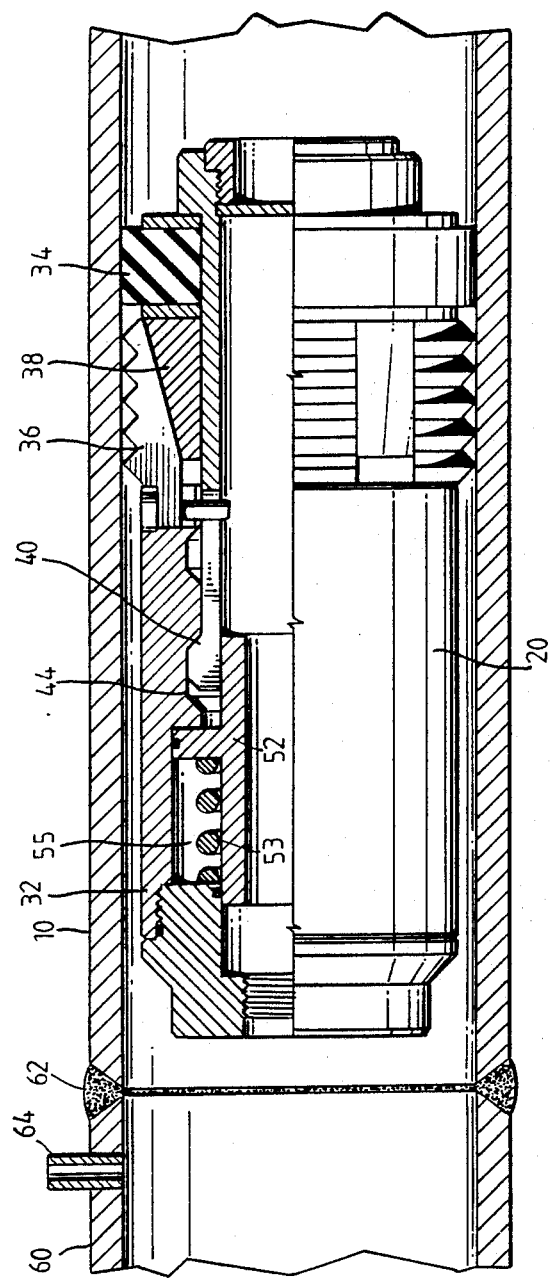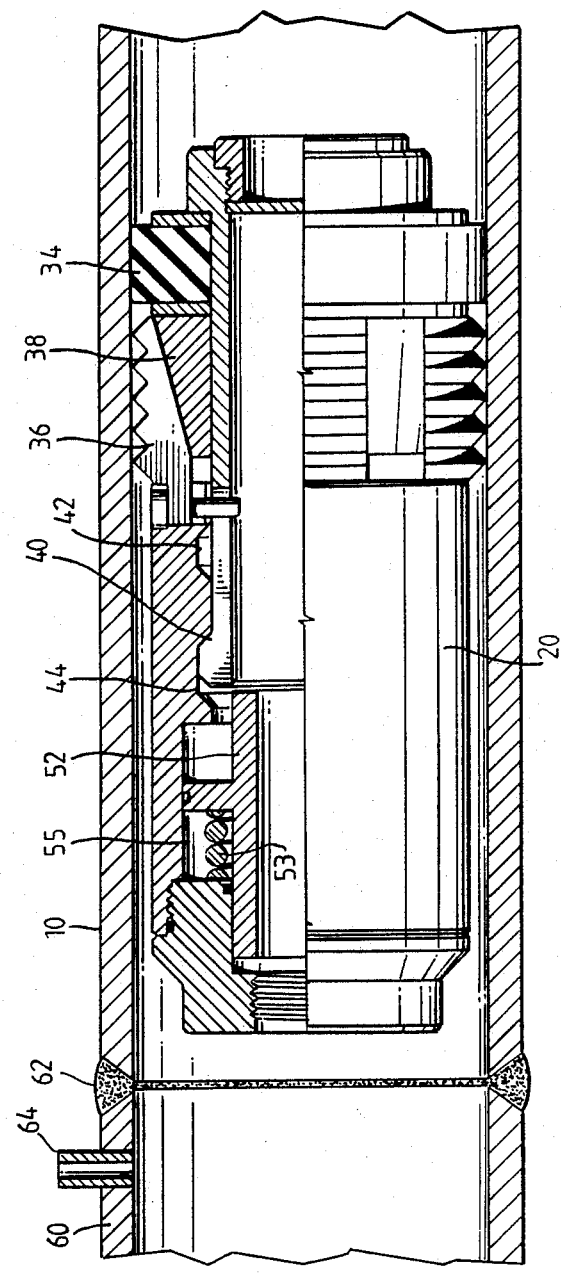

APPARATUS FOR REPLACING A SECTION OF A PIPELINE

BACKGROUND OF THE INVENTION

The present invention is directed to a method and apparatus for safely assisting the repair, modification or replacement of a section of a pipeline by shutting off the section to be replaced in the pipeline from the fluids such as gases, liquids and transported materials in the pipeline. After containing the fluids from the section to be replaced, the pipeline can be safely cut, welded and a new section replaced while reducing the possibility of explosion, fire or environmental damages.

While my U.S. Pat. No. 4,658,860 discloses one method of replacing a portion of a pipeline, the present invention allows a wider latitude in making repairs in remote locations accurately and quickly.

SUMMARY

The present invention is directed to a method of replacing a section of a pipeline which includes indenting the pipeline from the outside to provide a stop shoulder on the inside adjacent the section to be replaced, positioning an anchoring and seal means in the pipeline against the stop shoulder on the side away from the section and securing the anchoring and seal means to the inside of the pipeline. Thereafter, the section of the pipeline to be replaced is removed, including the stop shoulder, and is replaced with a new section and the anchoring and seal means is released and removed from the pipeline.

Still a further object of the present invention is wherein the stop shoulder is provided by cold forging the outside of the pipeline.

Still a further object of the present invention includes removing a part of the anchoring and seal means after removing the section of the pipeline and prior to replacing a new section for providing space for installing the new section.

Yet still a further object of the present invention includes providing a second stop shoulder in the inside of the pipeline on the opposite side of the section to be replaced from the first shoulder, positioning and securing a second anchoring and seal means against the second shoulder, and removing the second shoulder prior to replacing said new section.

Still a further object of the present invention is the method of replacing a section of the pipeline by indenting the pipeline from the outside to provide a stop shoulder on the inside adjacent to the section to be replaced, pumping an anchoring and seal means having a releasable no-go in the pipeline to position the no-go against the stop shoulder on the side of the shoulder away from the section, and securing the anchoring and seal means to the inside of the pipeline. Thereafter, the section of the pipeline to be replaced is removed including the stop shoulder and the no-go is released from the anchoring and seal means and removed from the pipeline for allowing space for replacement of the pipeline and a new section is replaced in the pipeline in the removed section. Thereafter, the anchoring and seal means is released and removed from the pipeline.

Still a further object of the present invention is the provision of an anchoring and sealing apparatus for use in a pipeline which includes a body with seal means on the body for sealing against the inside of the pipeline. Expandable and retractible anchoring means are provided on the body for anchoring the body to the inside of a pipeline and pressure actuating means is connected to the anchoring means for expanding and retracting the anchoring means. Releasable latch means are connected to the anchoring means for releasably holding the anchoring means in a restricted or expanded position and a releasable no-go is attached to the body. In addition, a pressure actuated lock for releasably locking the releasable latch may be provided.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 1 is a schematic, elevational view, in cross section, illustrating the use of a single anchoring and sealing pig in a pipeline adjacent a section to be replaced, FIG. 1A is a schematic, elevational view, in cross section, illustrating the use of two anchoring and sealing pigs in a pipeline on opposite sides of a pipeline to be replaced, FIG. 6 is a view illustrating removal of the no-go from the anchoring and sealing pig and beveling the pipeline for receiving a new section, FIG. 7 is a schematic elevational view, in cross section, illustrating the replacement of a new section in the pipeline, FIG. 8 is a schematic elevational view, in cross section, illustrating testing of the new section of the pipeline, FIG. 9 is a schematic and elevational view, in cross section, illustrating the start of releasing the anchoring and sealing pig.

BRIEF DESCRIPTION OF THE PREFERRED EMBODIMENT

Figure 2:
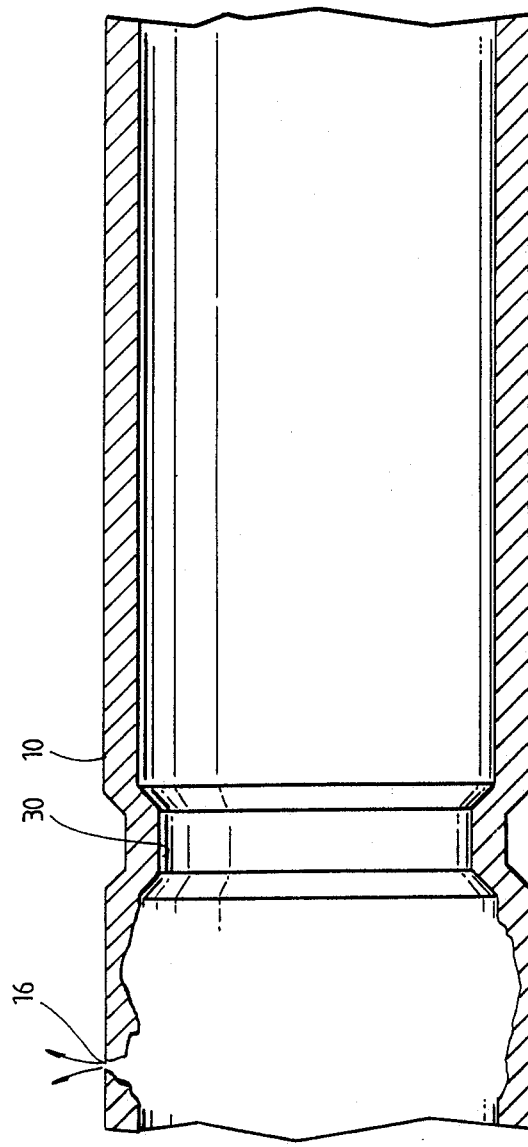
FIG. 2 is an enlarged elevational view of a section of the pipeline showing the provision of a stop shoulder on one side of a section to be replaced.

While the present method and apparatus may be used for replacing a section of a pipeline for various reasons, for purposes of illustration only, the present invention will be described in replacing a section of a pipeline having a leak therein. In addition, the term "pipeline" when used herein may be any type of tubular conduit through which various fluids, such as gases, liquids and transported materials, flow.

Referring now to FIG. 1, a riser-type pipeline, generally indicated by the reference numeral 10, is shown having a first end 12 leading to and oil and/or gas well platform and having a second end 14 leading to a well for receiving production fluids. In this case, the pipeline 10 includes a leak 16 which is desired to be repaired. In accordance with the present invention an anchoring and sealing means or pig 20, which will be more fully described hereinafter, is inserted at the platform end 12 of the pipeline 10 and pumped downwardly past the section 18 which is to be removed. Thereafter, and adjacent to the section 18 to be replaced, the pipeline 10 is intended from the outside to provide a stop shoulder 30 on the inside of the pipeline 10. The pump is reversed and the anchoring and seal means 20 is moved towards and seats against the shoulder 30. The anchoring and seal means 20 is then secured to the interior of the pipeline 10 and sealed to the inside of the pipeline for preventing high pressure well fluids from the line end 14 from flowing through the pipeline 10. The line 10 downstream of the pig 20 is bled off. Thereafter, the end 12 is cut off and removed from the pipeline 10 and replaced with a new section such as by welding. Thereafter, the anchoring and seal means 20 is released and pumped out of the line 10. It is to be noted that in the repair of FIG. 1 only a single anchoring and seal means 20 is utilized.

Referring now to FIG. 1A, in another embodiment of the present invention, the pipeline 10a has a leak 16a and has ends 12a and 14a. In this case, the anchoring and seal means 20a may be pumped into the pipeline 10 through the end 14a, or through the end 12a past the leak 16a and section 18a which is to be removed. Again, an indentation is made on the outside of the pipeline 10a to provide an internal shoulder 30a and the anchoring and sealing means 20a is positioned against the shoulder 30a and set in position. The fluid in the pipeline is then bled or a hot tap return connected in section 18a adjacent the leak 16a. A second shoulder 31 is formed internally of the pipeline 10a by indenting the outside of the pipeline and a second anchoring and seal means pig 21 pumped against the shoulder 31 set into place. Thereafter, the pipe section 18a is removed, replaced with a new section, tested and the anchoring and seal means 20a and 21 are released and pumped out of the pipeline 10a.

Referring now to FIG. 2, the pipeline 10 is shown having a pipeline leak 16 which is in a section 18 which is desired to be removed and replaced with a new section. Thus, an internal stop shoulder 30 is formed in the pipeline 10 by indenting from the outside of the line 10 such as by cold forging to provide one or more internal shoulders 30.

Figure 3:
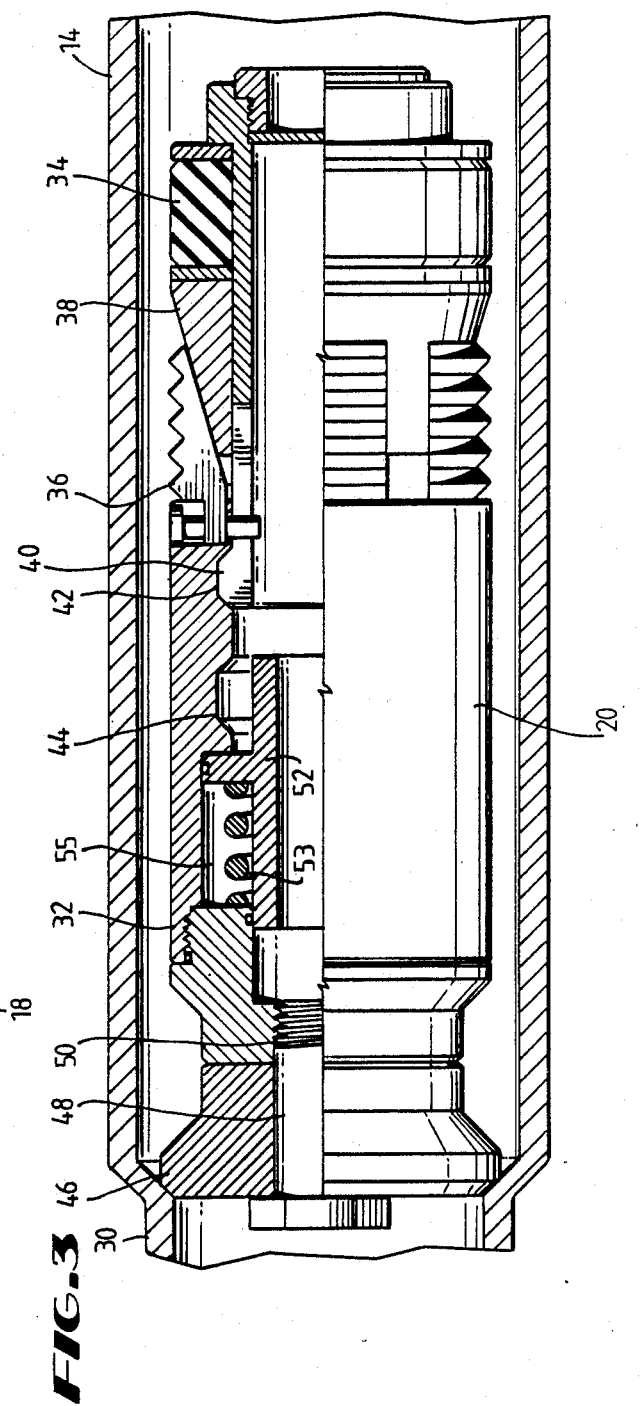
FIG. 3 is a schematic eleational view, in cross section, illustrating an anchoring and sealing pig positioned against the shoulder.

Referring now to FIG. 3, the anchoring and seal means or pig 20 has been pumped (by increasing pressure from the backside or reducing pressure on the front side) into location and stopped by the stop shoulder 30. The pig 20 generally includes a body 32, seal means 34, anchoring means such as a plurality of slips 36 which are actuated by movement of a wedge-shaped cone 38, a releasable collet latch 40, which coacts with notches 42 and 44 for positioning the slips 36 in the retracted or expandable position, respectively, and a releasable no-go 46 which is secured to the body by a plug 48 which in turn is releasably connected by threads 50 to the body 32. A pressurized lock 52 is provided for retaining and locking the collet latch 40 as will be more fully described hereinafter. While the seal means 34 is shown as an expandable type seal which is set by compression, the seal 34 may be a pig type pump cup and disk which engages the inside of line 10 for simplicity.

Figure 4:
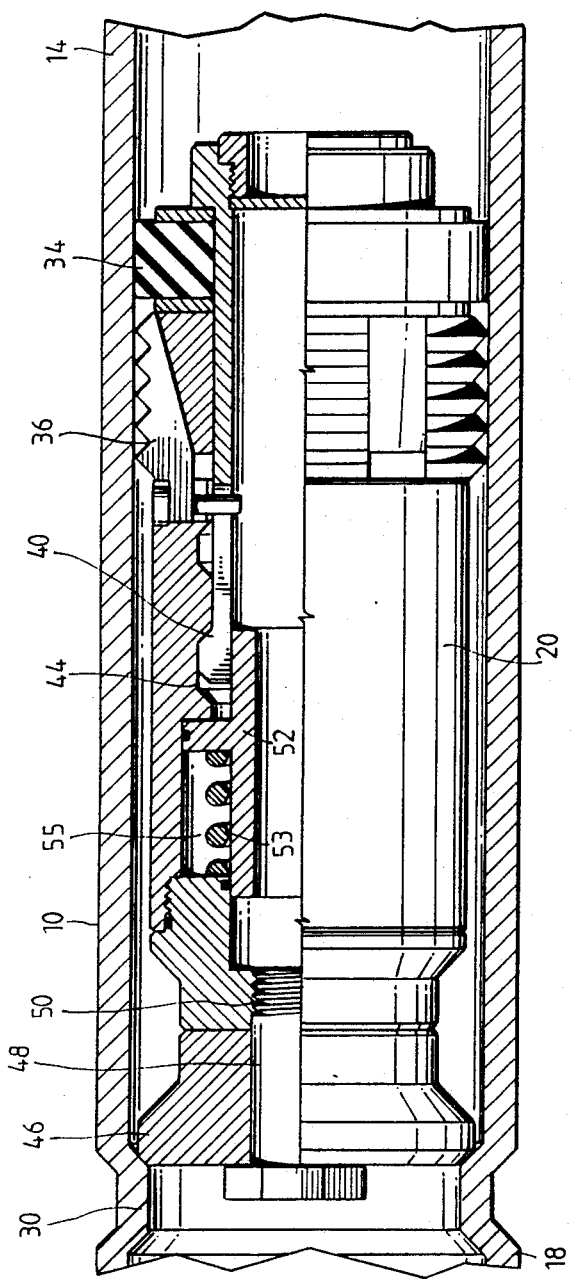
FIG. 4 is a schematic elevational view in cross section, similar to FIG. 3, showing the anchoring and sealing pig in a set position.

Referring now to FIG. 4, the pig 20 is shown in the set position and is actuated by pipeline pressure being applied at the pipeline end 14 against the pig 20 to move the seal element 20 and slips 36 outwardly into engagement with the interior of the pipeline 10 as the no-go 46 is positioned by the stop shoulder 30. In FIG. 4 it is noted that the collet latch 40 has moved into locking notch 44 by overcoming the collet retainer 52 which is normally urged outwardly by a spring 53 and pressurized gas 55. When collet 40 reaches groove 44, the retainer lock 52 slides over collet 40 locking it in the set position.

Figure 5:
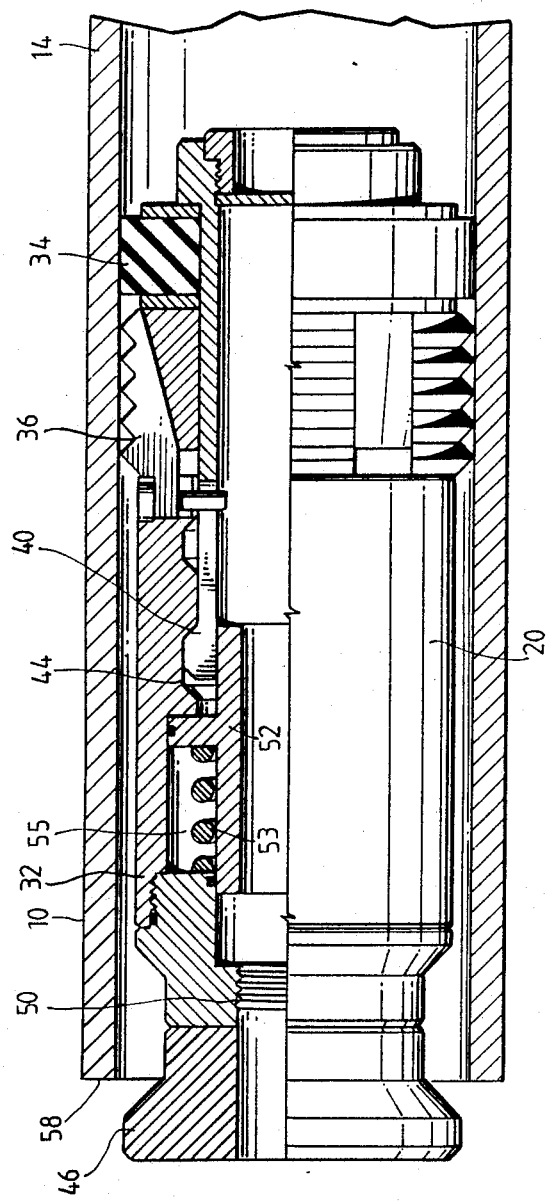
FIG. 5 is a schematic elevational view, in cross section, illustrating the removal of the section of the pipe to be replaced.

Referring now to FIG. 5, the pipeline 10 is cut to remove the undesired section 18 which contains the leak 16. However, it is to be noted from FIG. 5 that the stop shoulder has also been cut out of the pipeline as it has served its purpose in positioning the anchoring and sealing means 20 and is no longer needed. In fact, it must be removed in order to avoid restricting the pipeline when it is later put back into use. However, in order to insert a new tubular section of pipe in the pipeline 10 at the cut end 58, a portion of the pig 20 will interfere in inserting the new section. Therefore, the no-go 46 which is releasably connected to the body 32 may be removed by unscrewing the threaded plug 48. Thus, as best seen in FIG. 6, with the no-go 46 removed the cut end 58 of the pipe now extends free and clear of the structure of the pig 20 which remains securely anchored and sealingly engaged against the interior of the pipeline 10.

Referring now to FIG. 7, a new tubular section 60 may be connected in the removed portion of the pipeline 10 and secured therein by a weld 62. The new section 60 includes an entry port 64 if desired for filling the new section with fluid for testing as best seen in FIG. 8.

Referring now to FIG. 9, after testing is completed, fluid is inserted through the port 64 for releasing the pig 20. That is, sufficient pressurized fluid is inserted into the new section 60 and into the interior of the body 32 of the pig 20 to overcome the spring 53 and pressurized gas 55 for releasing the collet retainer lock 52 thereby releasing the collet latch 40. Once the collet latch 40 is free to move, it is moved to its original unset position, FIG. 10, by the force of the fluid acting against the cross-sectional area of the seal element 19 which removes the wedge cones 38 from the slips 36 thereby releasing the engagement of the pig 20 from the interior of the pipeline 10.

Figure 10:
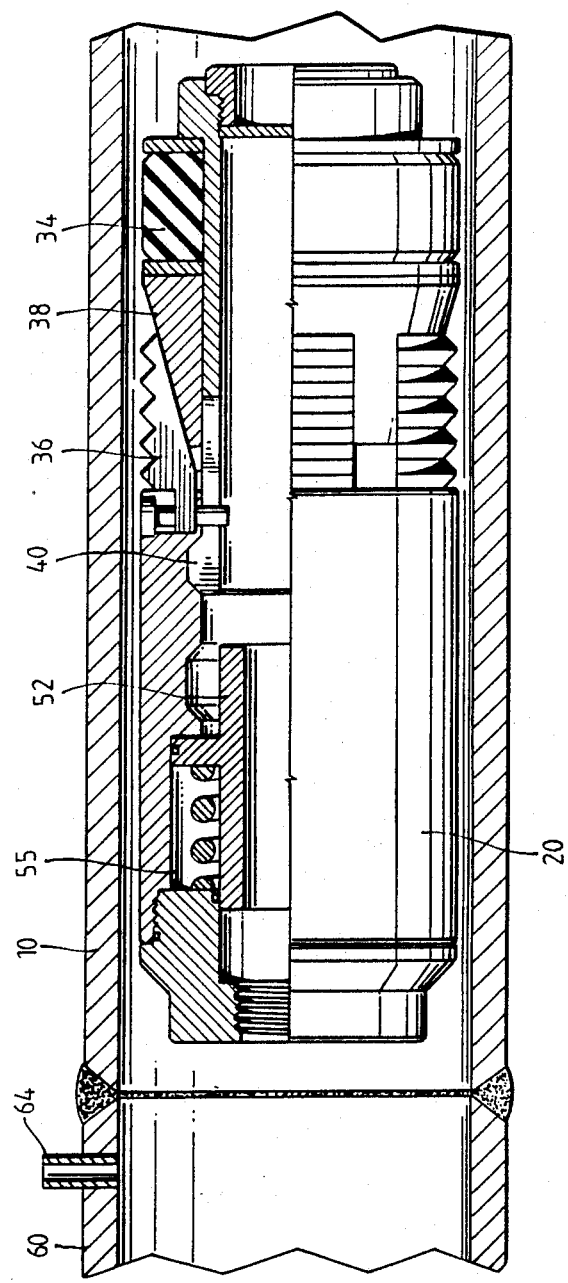
FIG. 10 is a schematic elevational view, in cross section, illustrating the pig in a released position ready to be pumped out of the pipeline.

As best seen in FIG. 10, the anchoring and sealing means 20 is now unset and can be pumped out of the pipeline 10.

The method of replacing a section of pipeline is apparent from the foregoing description of the apparatus and its operation. However, the method includes indenting the pipeline from the outside to provide a stop shoulder on the inside adjacent the section to be removed, positioning an anchoring and seal means in the pipeline against the stop shoulder on the side away from the section, securing the anchoring and seal means to the inside of the pipeline, removing the section of pipeline to be replaced including the stop shoulder, and replacing a new section in the removed section of the pipeline. Thereafter, the method includes releasing and removing the anchoring and seal means from the pipeline. The method further includes wherein the stop shoulder is provided by cold forging the outside of the pipeline. The method further includes removing a part of the anchoring and seal means after removing the section of the pipeline and prior to replacing a new section. The method may also include providing a second stop shoulder in the inside of the pipeline on the opposite side of the section to the first shoulder, positioning and securing a second anchoring and seal means against the second shoulder, and removing the second shoulder prior to replacing the new section.

The prsent invention, therefore, is well adapted to carry out the objects and attain the ends and advantages mentioned as well as others inherent therein. While presently preferred embodiments of the invention have been given for the purpose of disclosure, numerous changes in the details of construction and steps of the process, will be readily apparent to those skilled in the art and which are encompassed within the spirit of the invention and the scope of the appended claims.

What is claimed is:

1. A method of replacing a section of a pipeline comprising,
    indenting the pipeline from the outside whereby the pipeline forms a stop shoulder on the inside adjacent the section to be replaced,
    positioning an anchoring and seal means for attachment to and blocking flow through the pipeline in the pipeline against the stop shoulder on the side away from said section,
    securing the anchoring and seal means to the inside of the pipeline and blocking flow through the pipeline at a position spaced from the stop shoulder,
    removing the section of pipeline to be replaced including the stop shoulder while leaving the anchoring and seal means in position,
    replacing a new section in the removed section of the pipeline, and
    releasing and removing the anchoring and seal means from the pipeline.

2. The method of claim 1 wherein the stop shoulder is provided by cold forging the outside of the pipeline.

3. The method of claim 1 including,
    removing a part of the anchoring and seal means after removing the section of the pipeline and prior to replacing a new section.

4. The method of claim 1 including,
    providing a second stop shoulder in the inside of the pipeline on the opposite side of the section to be replaced from the first stop shoulder,
    positioning and securing a second anchoring and seal means against the second shoulder, and
    removing the second shoulder prior to replacing said new section.

5. A method of replacing a section of a pipeline comprising,
    indenting the pipeline from the outside whereby the pipeline forms a stop shoulder on the inside adjacent to the section to be replaced,
    pumping an anchoring and seal means for attachment to and blocking flow through the pipeline, having a releasable no-go shoulder, in the pipeline to position the no-go shoulder against the stop shoulder on the side of the stop shoulder away from said section,
    securing the anchoring and seal means to the inside of the pipeline,
    removing the section of pipeline to be replaced including the stop shoulder,
    removing the no-go shoulder from the pipeline,
    replacing a new section in the removed section section of the pipeline, and
    releasing and removing the anchoring and seal means from the pipeline.

* * * * *